United States Patent
Seppänen

(10) Patent No.: US 8,023,648 B2
(45) Date of Patent: Sep. 20, 2011

(54) ANONYMOUS TELECOMMUNICATION TRAFFIC MEASUREMENT DATA ASSOCIATED USER IDENTIFICATIONS

(75) Inventor: Kari Seppänen, Espoo (FI)

(73) Assignee: Valtion Teknillinen Tutkimuskesjus, Espoo (FI)

( * ) Notice: Subject to any disclaimer, the term of this patent is extended or adjusted under 35 U.S.C. 154(b) by 857 days.

(21) Appl. No.: 12/008,560

(22) Filed: Jan. 11, 2008

(65) Prior Publication Data

US 2008/0181405 A1 Jul. 31, 2008

(30) Foreign Application Priority Data

Jan. 12, 2007 (FI) .................................. 20070029

(51) Int. Cl.
*G06F 21/24* (2006.01)
(52) U.S. Cl. .......................................... 380/37; 713/182
(58) Field of Classification Search ..................... 705/74
See application file for complete search history.

(56) References Cited

U.S. PATENT DOCUMENTS

| 4,078,152 A | 3/1978 | Tuckerman, III |
| 7,743,247 B1 * | 6/2010 | Horgan et al. ................. 713/155 |
| 2004/0202322 A1 | 10/2004 | Chavanne et al. |
| 2008/0287118 A1 * | 11/2008 | Seppanen ..................... 455/423 |

FOREIGN PATENT DOCUMENTS

DE 199 11 176 A1 9/2000

* cited by examiner

*Primary Examiner* — Matthew Smithers
(74) *Attorney, Agent, or Firm* — Fay Sharpe LLP

(57) ABSTRACT

The invention allows anonymization of user identifications associated with telecommunication traffic measurement data that is fast, secure, and easy to use with distributed traffic measurements. Acquired user identification is input as an initialization vector to a block cipher. The block cipher is executed in cipher-block chaining mode to output a ciphertext. The output ciphertext is provided for use as an anonymized user identification in place of the user identification in further processing of the telecommunication traffic measurement data.

16 Claims, 7 Drawing Sheets

ANONYMOUS TELECOMMUNICATION TRAFFIC MEASUREMENT DATA ASSOCIATED USER IDENTIFICATIONS

BACKGROUND OF THE INVENTION

1. Field of the Invention

The invention relates generally to telecommunication traffic measurement. In particular, the invention relates to methods, computer programs and apparatuses for providing anonymous user identifications for use in processing telecommunication traffic measurement data.

2. Description of the Related Art

Today, various kinds of traffic measurements—e.g. traffic traces—are routinely performed on both packet switched and circuit switched telecommunication networks. For example in the case of packet switched networks, these traffic measurements may contain e.g. packet headers, signaling messages, and/or authorization log-files. Such traffic measurements are utilized e.g. in examining the status and performance of a network, and to ensure the correct operation of the network. Furthermore, traffic analysis based on these measurements provides valuable data about user behavior and trends in application and network usage.

Typically, the traffic measurements contain identification information that can be used to identify subscribers and the kind of services the subscribers are using. Obviously, such identification information is highly confidential and usually only the network operator is legally allowed to handle it and even then only for certain reasons, such as troubleshooting and accounting.

Traditionally, this confidentiality has not caused problems since such measurements have been conducted by the network operator using e.g. specialized Synchronous Digital Hierarchy (SDH) or Signaling System #7 (SS7) signaling analyzers.

However, there is an increasing trend of outsourcing network management tasks. As a result, traffic measurement data including subscriber identification information of a given network may today be handled or processed by staff external to the operator of the given network. Obviously, this contradicts the above confidentiality requirement.

Given that in most traffic measurement and analysis cases it is not necessary to know the actual identities of the subscribers—rather being able to find out which packet or call belongs to which particular anonymous subscriber is sufficient—the above confidentiality requirement may be met by anonymizing the traffic measurement data by replacing each included real user identification with an unique label. Often, the traffic measurement data contains multiple information fields that need to be anonymized, e.g. telephone numbers, subscriber line identifications, IP addresses, and the like. Even anonymized measurement data can be used to track the traffic from and to a given subscriber: the network operator can provide an anonymized user identification of the given subscriber to outsourced network management staff and ask them to find out, for example, whether something in the network is degrading the performance for the given subscriber.

While there are prior art concepts for anonymizing traffic traces they all have significant drawbacks: usually they are either not secure enough, not fast enough, or not suitable for distributed on-line measurements.

For example, it is known to encrypt the user identifications included in the traffic measurement data using straightforward symmetric encryption. However, given that a user identification (e.g. a telephone number or an IP address) to be encrypted, i.e. the plaintext, is relatively short (typically 32-128 bits), and given that typically there is only a limited set of possible user identifications, symmetric encryption based anonymization schemes are insecure. If an attacker knows or has enough hints to guess from which network a traffic trace originates, the attacker can use known addresses to find out ciphertext—plaintext pairs. For example, in the case of TCP/IP traces, port numbers can easily reveal well known servers in the target network, such as Domain Name System (DNS), mail, and Post Office Protocol (POP) servers. Furthermore, the attacker can launch an active attack if the attacker knows that traffic trace collection is presently ongoing. In the active attack, the attacker starts e.g. a TCP/IP session at a certain time and records that session. Later, the attacker can use a fingerprint of that TCP/IP session to find the same fingerprint among the traffic trace being thus able to gain many plaintext—ciphertext pairs.

Furthermore, it is known to use cryptographic hash functions to encrypt the user identifications included in the traffic measurement data. However, cryptographic hash functions, such as those based on public key encryption, are computationally expensive and thus too slow for on-line anonymizations at line-speed. For example, tests performed by the applicant with a 1.89 GHz Fujitsu SparcV show that, while normal encryption speed of 64-bit blocks with Data Encryption Standard (DES) is $2.5 \times 10^6$ 1/s, the speed of hashing with DES is only $47 \times 10^3$ 1/s.

In addition, it is known to replace a user identification included in the traffic measurement data with a unique label or the like. Such unique labels or the like may be stored e.g. in a replacement table. However, such replacement schemes are not suitable for distributed on-line measurements, particularly given that such a replacement table is usually generated on-the-fly. While a pre-made replacement table could theoretically be distributed to measurement locations, such replacement tables would be extremely large—e.g. approximately 32 GB for 32-bit IPv4 addresses—impeding distribution of such replacement tables significantly. Thus, this replacement scheme is typically used with post-processing measurement data in a centralized location where it is easy to share the replacement table.

Anonymization of user identifications included in or otherwise associated with telecommunication traffic measurement data needs to be secure, and fast enough to allow the anonymization to be performed on-line, and easy to use with distributed traffic measurements. The anonymization speed is important because, if anonymizations can be done at the rate of line-speed, there is no need to store user identifications temporarily to hard-disk or memory. Distributed traffic measurements are needed e.g. when it is necessary to inspect the performance of various parts of a network. Such measurements are becoming more and more important, particularly as traditional TDM (Time-Division Multiplexing) transport networks are being replaced with heterogeneous packet networks. Locating faults (such as degraded performance) and ensuring Quality of Service are much harder tasks in packet based networks than they used to be in legacy telecommunication networks. Furthermore, few common monitoring functions are shared by various vendors. Thus, distributed traffic measurements are usually required to pin point hard-to-catch errors in heterogeneous networks.

Therefore, an object of the present invention is to alleviate the problems described above and to introduce anonymization of user identifications included in or otherwise associated with telecommunication traffic measurement data that is fast, secure, and easy to use with distributed traffic measurements.

SUMMARY OF THE INVENTION

A first aspect of the present invention is a method of anonymizing telecommunication traffic measurement data associated user identifications. A user identification associated with telecommunication traffic measurement data is acquired. The acquired user identification is input as an initialization vector to a block cipher. The block cipher is executed in cipher-block chaining mode to output a ciphertext. The output ciphertext is provided for use as an anonymized user identification in place of the user identification in further processing of the telecommunication traffic measurement data.

A second aspect of the present invention is an apparatus for anonymizing telecommunication traffic measurement data associated user identifications. The apparatus comprises an anonymizer that is configured to input an acquired user identification as an initialization vector to a block cipher, wherein the acquired user identification is associated with telecommunication traffic measurement data. The anonymizer is further configured to execute the block cipher in cipher-block chaining mode to output a ciphertext. The anonymizer is further configured to provide the output ciphertext for use as an anonymized user identification in place of the user identification in further processing of the telecommunication traffic measurement data.

A third aspect of the present invention is a computer program embodied on a computer readable medium. The computer program controls a data-processing device to perform the steps of:

acquiring a user identification associated with telecommunication traffic measurement data;

inputting the acquired user identification as an initialization vector to a block cipher;

executing the block cipher in cipher-block chaining mode to output a ciphertext; and providing the output ciphertext for use as an anonymized user identification in place of the user identification in further processing of the telecommunication traffic measurement data.

In an embodiment of the invention, a first predetermined string is input to the block cipher as a cipher key, and a second predetermined string is input to the block cipher as a plaintext.

In an embodiment of the invention, the first predetermined string and the second predetermined string to be input to the block cipher are generated, e.g. randomly.

In an embodiment of the invention, the cipher-block chaining mode consists of one encryption stage. In this embodiment, the second predetermined string is input as the plaintext to the one encryption stage. Furthermore, length of the second predetermined string may be at least twice the length of the user identification.

In an embodiment of the invention, the cipher-block chaining mode consists of a given number of subsequent encryption stages. In this embodiment, the second predetermined string is divided into the given number of plaintext blocks of equal block length. Each of the plaintext blocks is then input to a separate one of the encryption stages. Furthermore, the block length may be at least twice the length of the user identification.

In an embodiment of the invention, the first predetermined string is re-utilized as the cipher key and the second predetermined string is re-utilized as the plaintext in anonymizing at least one subsequent telecommunication traffic measurement data associated user identification.

In an embodiment of the invention, the first predetermined string and the second predetermined string are distributed for use in anonymizing at least one subsequent telecommunication traffic measurement data associated user identification.

In an embodiment of the invention, the anonymized user identification is cached with the corresponding user identification for re-use.

In an embodiment of the invention, the anonymized user identification is decrypted with the first predetermined string and the second predetermined string.

The embodiments of the invention described above may be used in any combination with each other. Several of the embodiments may be combined together to form a further embodiment of the invention. A method, an apparatus or a computer program which is an aspect of the invention may comprise at least one of the embodiments of the invention described above.

The invention allows anonymization of user identifications included in or otherwise associated with telecommunication traffic measurement data that is fast, requiring no temporary storing of user identifications to hard-disk or memory. Furthermore, the invention allows anonymization that is secure. Furthermore, the invention allows anonymization that is easy to use with distributed traffic measurements. Furthermore, since the present invention is based on a well known secure block cipher mode of operation, facilitates implementation already existing implementations can be utilized. This is especially important in view of hardware based implementations: developing a high speed cryptographic accelerator ASIC (application-specific integrated circuit) or FPGA (field programmable gate array) would be a complex and time consuming task. Since the present invention is based on a well-known block cipher mode of operation, it can be implemented using a prior art block cipher algorithm. Performance-wise, the present invention is able to reach a performance level of at least a million anonymizations per second providing thus sufficient encoding speed for on-line measurements.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
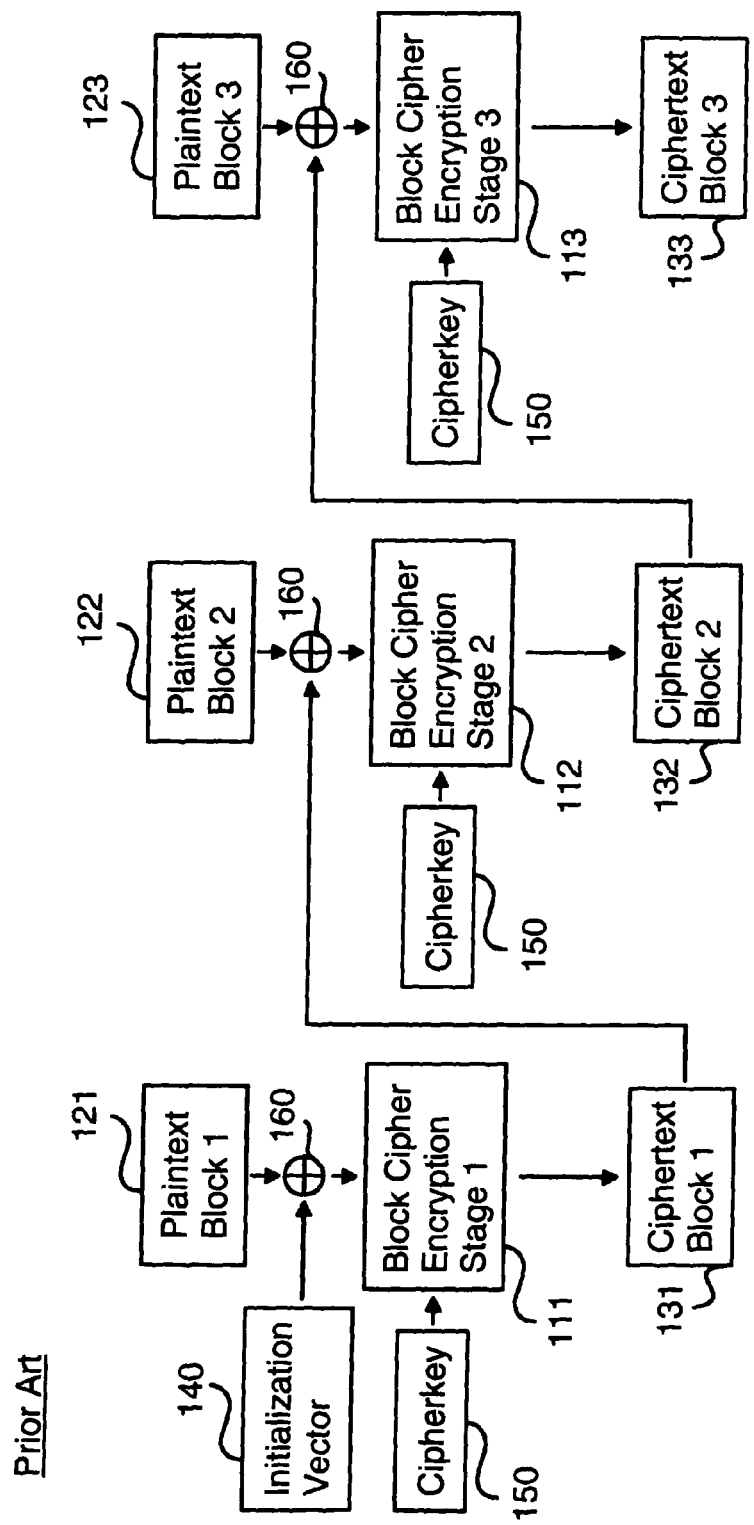
FIG. 1 is a block diagram illustrating prior art cipher-block chaining mode of operation.

FIG. 1 is a block diagram illustrating prior art cipher-block chaining mode of operation that is utilized in the present invention in a novel and inventive way, as will be described below in reference to FIGS. 2a-2d and 3.

A block cipher is a symmetric key cipher that operates on fixed-length groups of bits, referred to as blocks. When encrypting, a block cipher takes a block of plaintext (i.e. data to be encrypted) of given length or block size (e.g. 128 bits) as input, and outputs a block of ciphertext (i.e. encrypted data) of corresponding length. A second input, referred to as a cipherkey, is used to control the encryption transformation.

In order to encrypt messages longer than the block size (128 bits in the above example), a mode of operation is used. There are several known modes of operation, one of which is "cipher-block chaining" (CBC), illustrated in FIG. 1.

In a mode of operation the data or message to be encrypted is split into blocks of equal block size, and the blocks are successively encrypted, each in its own encryption stage. Assuming we have a message of 384 bits that we want to encrypt, and further assuming the block size is 128 bits, the message is split into three plaintext blocks 121, 122, 123, each 128 bits in length.

At first, a logical "exclusive or (XOR)"-operation 160 is applied to the first plaintext block 121 and an initialization vector 140. The initialization vector 140 is an arbitrary block of data that is used to start the process and to provide randomness. The result of the XOR-operation 160, as well as the cipherkey 150, is input to the first encryption stage 111. As a result, a first ciphertext block 131 is produced.

Then, the XOR-operation 160 is applied to the first ciphertext block 131 and the second plaintext block 122. The result is input to the second encryption stage 112 together with the cipherkey 150. As a result, a second ciphertext block 132 is produced.

Finally, the XOR-operation 160 is applied to the second ciphertext block 132 and the third plaintext block 123. The result is input to the third encryption stage 113 together with the cipherkey 150. As a result, a third ciphertext block 133 is produced. The encrypted message then constitutes the combined ciphertext blocks 131, 132 and 133.

Mathematically encryption with cipher-block chaining may be expressed as:

$$C_i = E_k(P_i \oplus C_{i-1}), C_0 = IV,$$

for ciphertext C, plaintext P, cipherkey k, initialization vector IV, and encryption algorithm E.

Correspondingly, decryption with cipher-block chaining may be expressed as:

$$P_i = D_k(C_i) \oplus C_{i-1}, C_0 = IV,$$

for ciphertext C, plaintext P, cipherkey k, initialization vector IV, and decryption algorithm D.

Figure 2A:
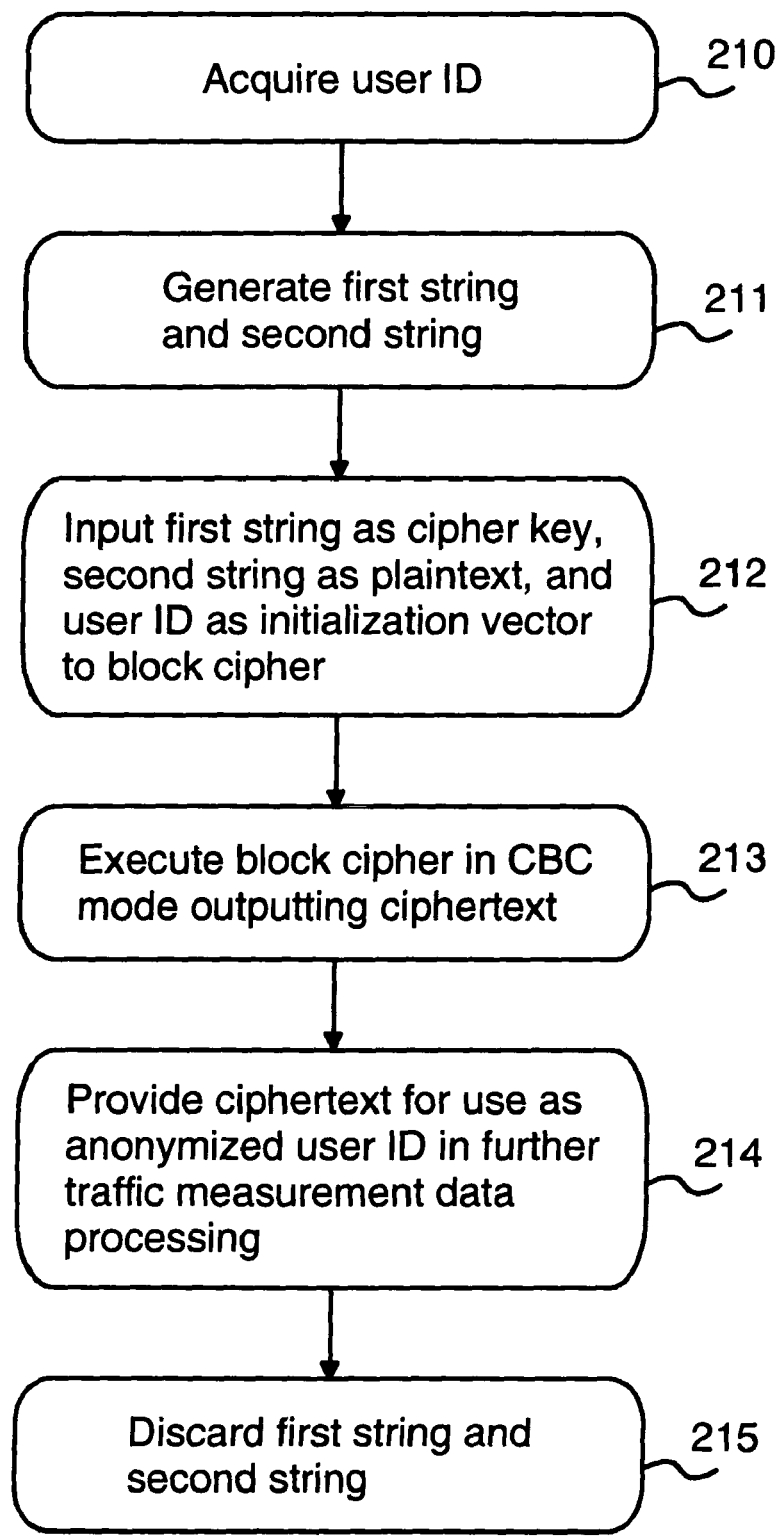
FIGS. 2a-2d are flow diagrams illustrating various embodiments of a method according to the present invention.

FIGS. 2a-2d are flow diagrams illustrating various embodiments of a method according to the present invention. FIG. 2a illustrates anonymizing telecommunication traffic measurement data associated user identifications (such as telephone numbers or IP addresses), e.g. when there is a single measurement device and a single measurement session.

At step 210, at least one user identification that is included or otherwise associated with given telecommunication traffic measurement data collected in a measurement session is acquired. A first string and a second string are generated, step 211. Since, in the embodiment of FIG. 2a, the first and second strings will be used for one measurement session only, they can be generated as needed. E.g. a suitable random number generator may be used in generating the first and second strings.

The acquired user identification is input as an initialization vector to a block cipher. Furthermore, the generated first string is input to the block cipher as a cipherkey, and the generated second string is input to the block cipher as a plaintext, step 212. Then, at step 213, the block cipher is executed in cipher-block chaining mode to output a ciphertext. If there are multiple user identifications to be anonymized, each of the multiple user identifications will be encrypted similarly at steps 212-213, typically using the same generated first string as the cipherkey and the same generated second string as the plaintext.

At step 214, the output ciphertext is provided for use as an anonymized user identification in place of the user identification in further processing of the telecommunication traffic measurement data. If multiple user identifications were anonymized, the multiple produced ciphertexts are provided for use as anonymized user identifications.

The embodiment of FIG. 2a also includes an optional step 215 in which the generated first and second strings are discarded, e.g. in order to prevent the anonymized user identifications from being decrypted.

Figure 2B:
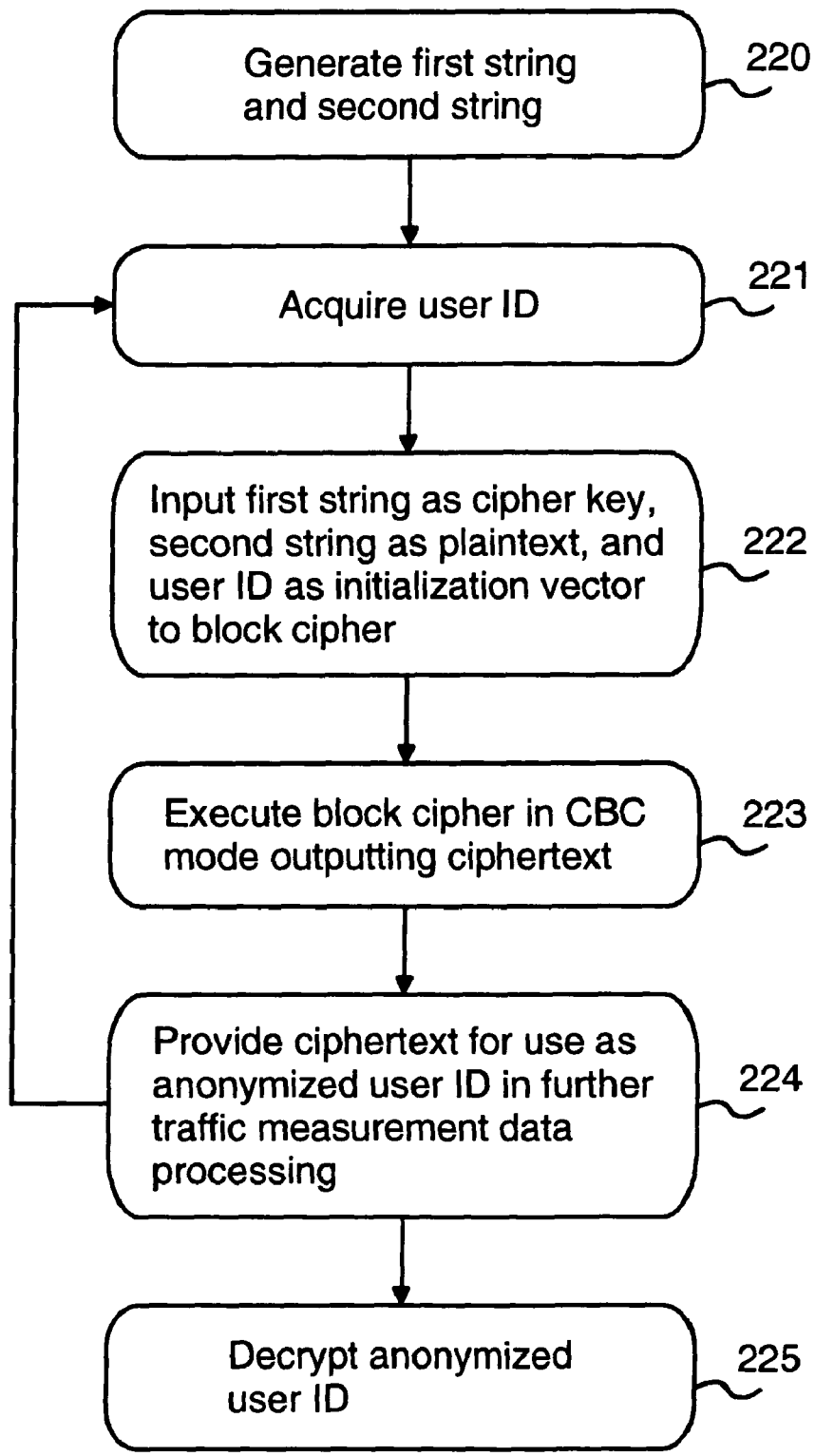

FIG. 2b illustrates anonymizing telecommunication traffic measurement data associated user identifications, e.g. when there is a single measurement device and multiple subsequent measurement sessions.

A first string and a second string are generated, step 220. At step 221, at least one user identification that is included or otherwise associated with given telecommunication traffic measurement data collected in a first measurement session is acquired.

The acquired user identification is input as an initialization vector to a block cipher. Furthermore, the generated first string is input to the block cipher as a cipherkey, and the generated second string is input to the block cipher as a plaintext, step 222. Then, at step 223, the block cipher is executed in cipher-block chaining mode to output a ciphertext. If there are multiple user identifications to be anonymized, each of the multiple user identifications are encrypted similarly at steps 222-223, typically using the same generated first string as the cipherkey and the same generated second string as the plaintext.

At step 224, the output ciphertext is provided for use as an anonymized user identification in place of the user identification in further processing of the telecommunication traffic measurement data. If multiple user identifications were anonymized, the multiple produced ciphertexts are provided for use as anonymized user identifications.

The above steps 221-224 provided anonymization of the user identifications collected in the first measurement session. In response to a second measurement session with a second set of traffic measurement data including a second set of user identifications, the embodiment of the method according to the invention illustrated FIG. 2b returns to step 221 launching the anonymization of the second set of user identifications.

The embodiment of FIG. 2b also includes an optional step 225 in which at least one anonymized user identification is decrypted using the first and second string generated at step 220. Mathematically the decryption may be expressed as:

$$U_m = P_0 \oplus D_k(A_m),$$

for user identification $U_m$, first string (cipherkey) k, second string (plaintext) P, anonymized user identification $A_m$, and decryption algorithm D.

Figure 2C:
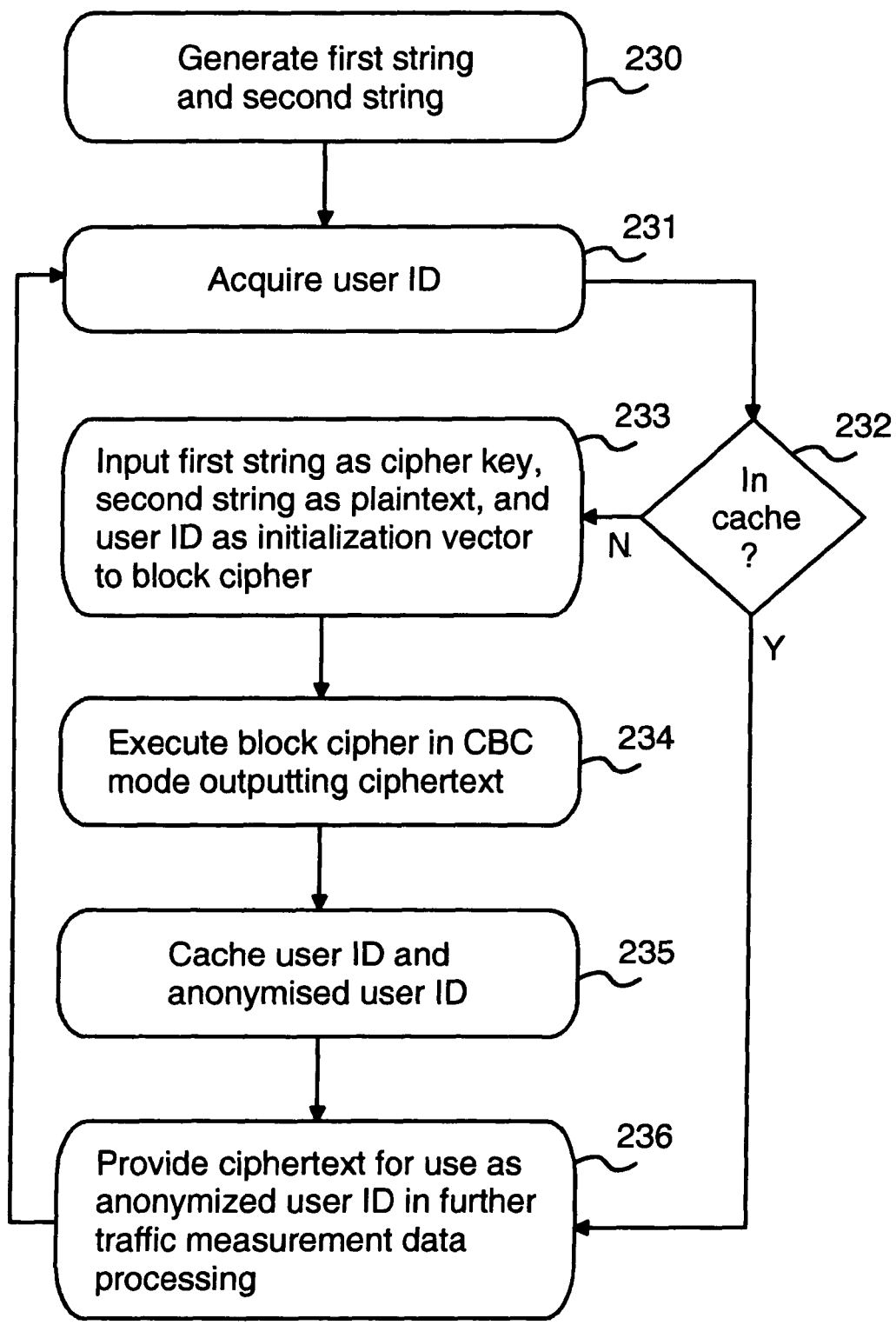

FIG. 2c illustrates anonymizing telecommunication traffic measurement data associated user identifications, e.g. when there is a single measurement device and multiple subsequent measurement sessions, and when caching is utilized e.g. to save computing power.

A first string and a second string are generated, step 230. At step 231, at least one user identification that is included or otherwise associated with given telecommunication traffic measurement data collected in a first measurement session is acquired.

At step 232, it is checked whether user identification being processed and the corresponding anonymized user identification were cached in a previous anonymization process. If the user identification being processed and the corresponding anonymized user identification are found in the cache, the method proceeds directly to step 236. If the user identification being processed and the corresponding anonymized user identification are not found in the cache, the method proceeds to step 233 in which the acquired user identification is input as an initialization vector to a block cipher. Furthermore, the generated first string is input to the block cipher as a cipherkey, and the generated second string is input to the block cipher as a plaintext. Then, at step 234, the block cipher is executed in cipher-block chaining mode to output a ciphertext. If there are multiple user identifications to be anonymized, each of the multiple user identifications are encrypted similarly at steps 233-234, typically using the same generated first string as the cipherkey and the same generated second string as the plaintext.

At step 235, the produced ciphertext or ciphertexts (i.e. the anonymized user identifications) are cached for future re-use together with the corresponding user identifications. Typically, all possible user identifications (e.g. all $2^{32}$ IPv4 addresses) are not used in a single measured telecommunication network. Furthermore, most or at least some of the user identifications will be repeating multiple times in the collected traffic measurement data. Therefore, caching can save a significant amount of computation power. Caching may be implemented e.g. by storing pairs of user identifications and corresponding anonymized user identifications in a data structure, such as a hash table.

At step 236, the output ciphertext is provided for use as an anonymized user identification in place of the user identification in further processing of the telecommunication traffic measurement data. If multiple user identifications were anonymized, the multiple produced ciphertexts are provided for use as anonymized user identifications.

The above steps 231-236 provided anonymization of the user identifications collected in the first measurement session. In response to a second measurement session with a second set of traffic measurement data including a second set of user identifications, the embodiment of the method according to the invention illustrated FIG. 2c returns to step 231 launching the anonymization of the second set of user identifications.

Figure 2D:
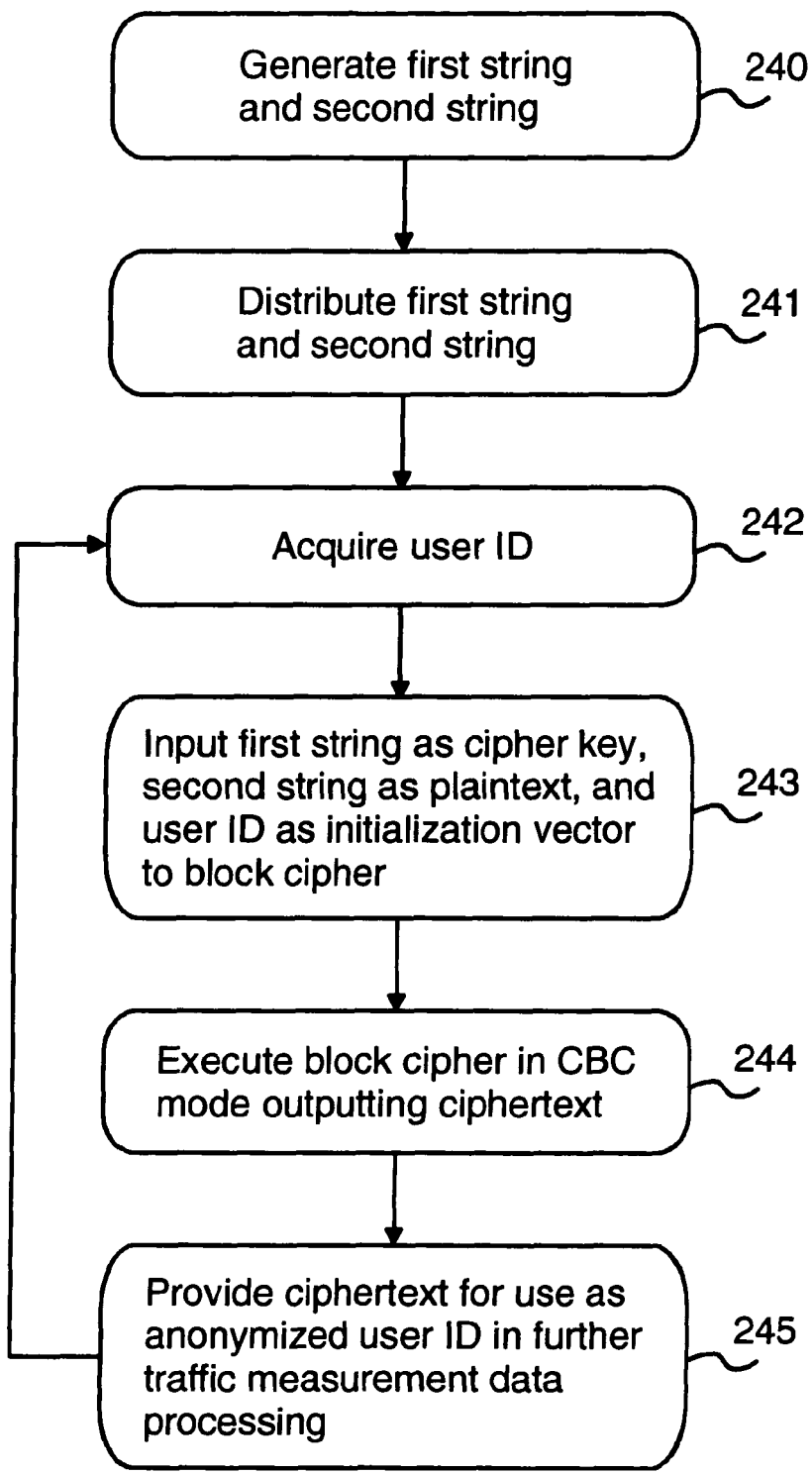

FIG. 2d illustrates anonymizing telecommunication traffic measurement data associated user identifications, e.g. when there are multiple measurement devices and multiple subsequent measurement sessions.

A first string and a second string are generated, step 240. The generated first and second strings are distributed using a suitable distribution scheme, step 241. More detailed examples of this distribution are provided with reference to FIG. 3b. At step 242, at least one user identification that is included or otherwise associated with given telecommunication traffic measurement data collected in a first measurement session is acquired.

The acquired user identification is input as an initialization vector to a block cipher. Furthermore, the generated/distributed first string is input to the block cipher as a cipherkey, and the generated/distributed second string is input to the block cipher as a plaintext, step 243. Then, at step 244, the block cipher is executed in cipher-block chaining mode to output a ciphertext. If there are multiple user identifications to be anonymized, each of the multiple user identifications are encrypted similarly at steps 243-244, typically using the same generated/distributed first string as the cipherkey and the same generated/distributed second string as the plaintext.

At step 245, the output ciphertext is provided for use as an anonymized user identification in place of the user identification in further processing of the telecommunication traffic measurement data. If multiple user identifications were anonymized, the multiple produced ciphertexts are provided for use as anonymized user identifications.

The above steps 242-245 provided anonymization of the user identifications collected in the first measurement session. In response to a second measurement session with a second set of traffic measurement data including a second set of user identifications, the embodiment of the method according to the invention illustrated FIG. 2d returns to step 242 launching the anonymization of the second set of user identifications.

Figure 3A:
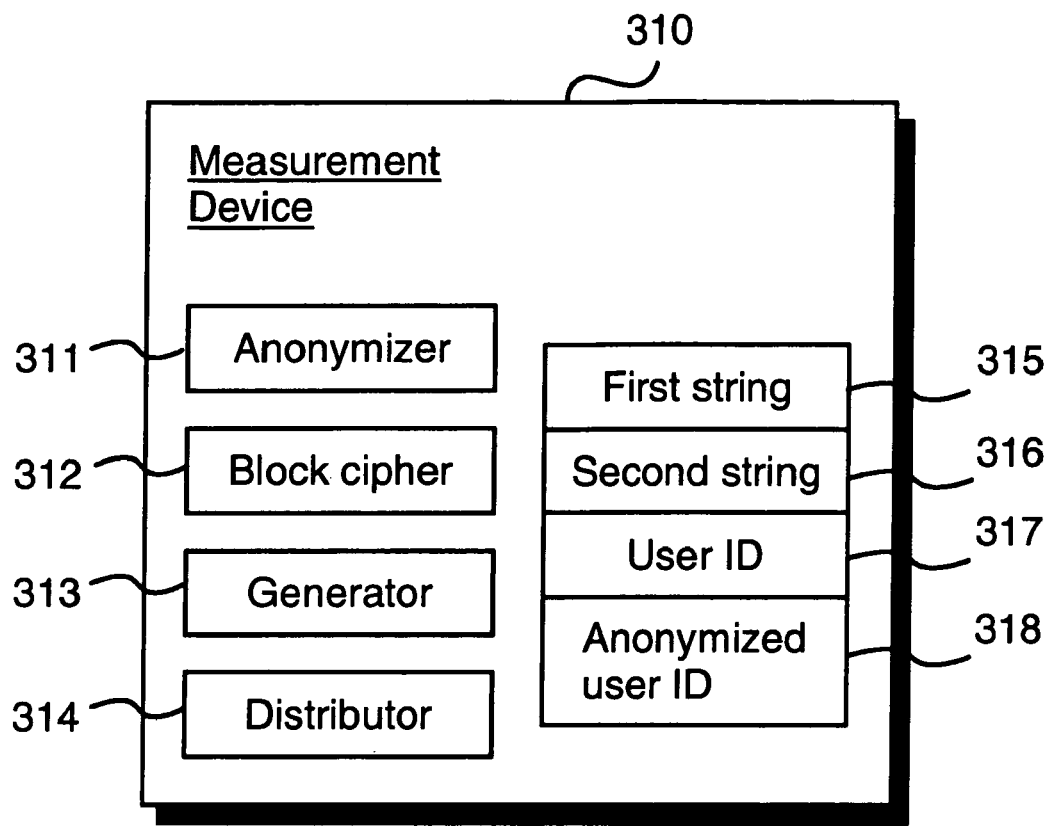
FIG. 3a is a block diagram illustrating an apparatus according to an embodiment of the present invention.

FIG. 3a is a block diagram illustrating an apparatus 310 according to an embodiment of the present invention. The apparatus 310 may comprise e.g. a measurement device used to collect telecommunication traffic measurement data with associated user identifications 317 (e.g. telephone numbers or IP addresses). Typically, the apparatus 310 is managed and operated by a network operator associated with the telecommunication network from which the traffic measurement data is being collected.

The apparatus 310 comprises a generator 313 configured to generate a first string 315 and a second string 316. The apparatus 310 further comprises an anonymizer 311 that is configured to input the acquired user identification 317 as an initialization vector to a block cipher 312. Furthermore, the anonymizer 311 is configured to input the first string 315 as a cipher key to the block cipher 312 and the second string 316 as a plaintext to the block cipher 312. The anonymizer 311 is further configured to execute the block cipher 312 in cipher-block chaining mode to output a ciphertext. The anonymizer 311 is further configured to provide the output ciphertext for use as an anonymized user identification 318 in place of the user identification 317 in further processing of the telecommunication traffic measurement data.

Furthermore, in the embodiment illustrated in FIG. 3a, the apparatus 310 comprises a distributor 314 configured to distribute the first string 315 and the second string 316 for use in anonymizing at least one subsequent telecommunication traffic measurement data associated user identification.

Figure 3B:
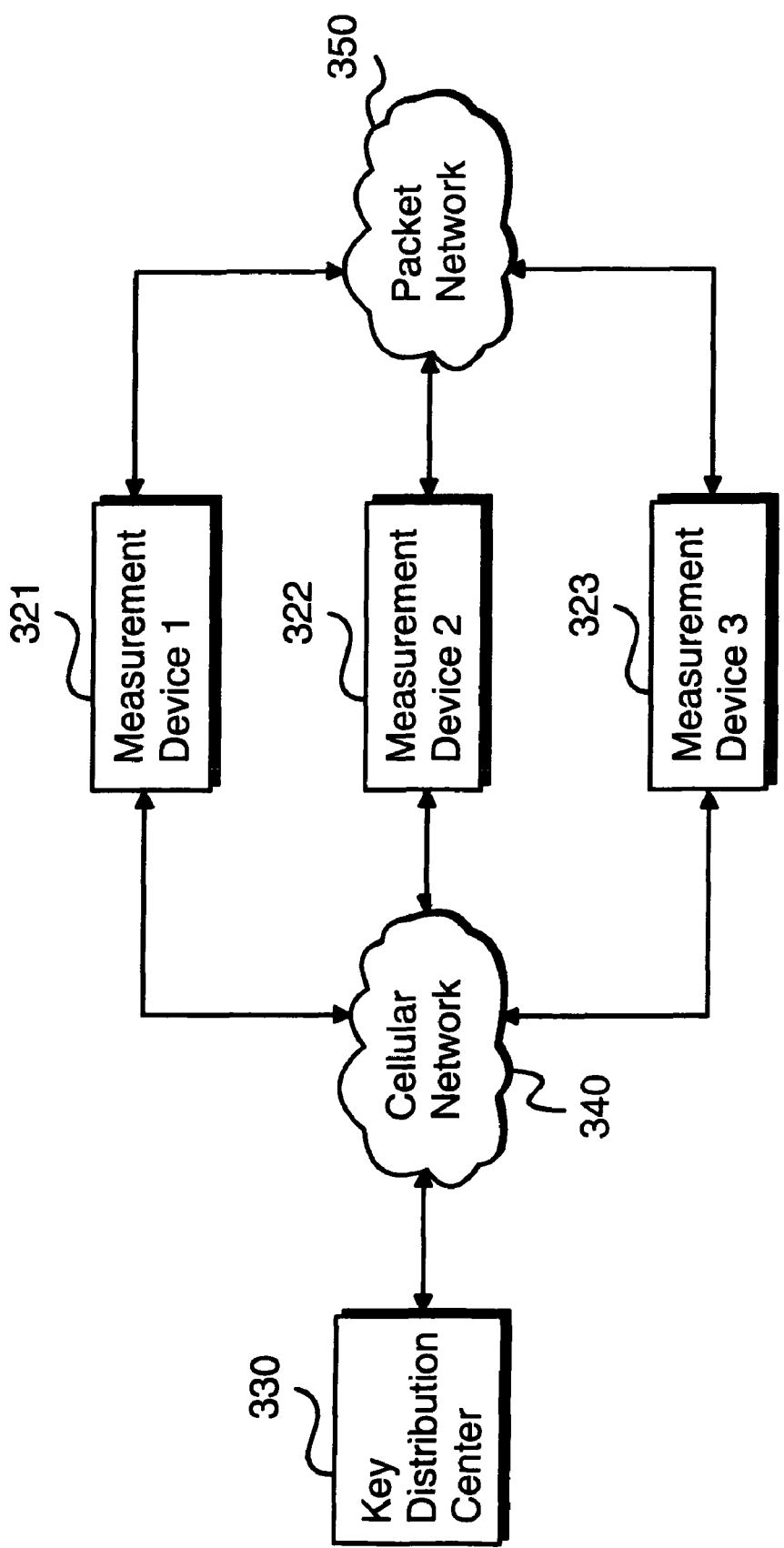
FIG. 3b is a block diagram illustrating a distribution arrangement for several apparatuses according to an embodiment of the present invention.

FIG. 3b is a block diagram illustrating a distribution arrangement for several apparatuses according to an embodiment of the present invention.

FIG. 3b illustrates three apparatuses 321, 322 and 323 for anonymizing telecommunication traffic measurement data associated user identifications according to the present invention. The apparatuses 321, 322 and 323 may be similar to the apparatus 310 of FIG. 3a. Furthermore, the apparatuses 321, 322 and 323 may each comprise e.g. a measurement device used to collect the telecommunication traffic measurement data. The collected telecommunication traffic measurement data may relate to e.g. packet network 350.

Typically, a fixed Internet access is unavailable for measurement devices at a measurement site. Furthermore, connecting a measurement device to public Internet would be a security threat in itself. Therefore, the present invention proposes distributing the first and second generated strings 315 and 316 or anonymization keys based on secure access to a key distribution center 330 via cellular network 340 by using cellular phones. First, a one-time password is obtained using e.g. a Short Message Service (SMS) message. Then, a secure connection is established from the apparatus 321, 322, or 323 using the distributor 314 to the key distribution center 330 over the cellular network 340. Then, the obtained one-time password is used to authorize access to the key distribution center 330. In response to a successful authorization, the key distribution center 330 delivers the first and second generated strings 315 and 316 to the requesting apparatus 321, 322, or 323 using e.g. a secure key exchange protocol.

It is to be understood that the cipher-block chaining mode may have one encryption stage or several consecutive encryption stages. When the cipher-block chaining mode has one encryption stage, the second string is input as the plaintext to the one encryption stage. Furthermore, length of the second string may be at least twice the length of the user identification. When the cipher-block chaining mode has a given number of subsequent encryption stages, the second string is divided into the given number of plaintext blocks of equal block length. Each of the plaintext blocks is then input to a separate one of the encryption stages. Furthermore, the block length may be at least twice the length of the user identification.

When the length of the second string exceeds the length of the user identification in the case of the cipher-block chaining mode having one encryption stage, and when the block length of the second string exceeds the length of the user identification in the case of the cipher-block chaining mode having several encryption stages, the user identification may be lengthened to equal the length of the second string or the block length of the second string, respectively, in order to enable the logical XOR-operation applied in the step of executing the block cipher in the cipher-block chaining mode. This lengthening may be performed using a suitable scheme. For example, the lengthening may be performed by adding a pad field to the user identification, or by concatenating the user identification with e.g. a result of a hash function applied to the user identification.

Mathematically the encryption utilized in the anonymization according to the present invention may be expressed as:

$$A_{m,0} = E_k(P_0 \oplus U_m)$$

$$A_{m,i} = E_k(P_i \oplus A_{i-1}) | i>0,$$

for user identification $U_m$, first string (cipherkey) k, second string (plaintext) P, anonymized user identification $A_m$, and encryption algorithm E.

Typically, the anonymization would be performed by a network operator associated with the telecommunication network from which the traffic measurement data is being collected. The anonymized user identifications would then be provided to an external party (e.g. outsourced network management staff) for further processing.

Tests performed by the applicant with a 1.89 GHz Fujitsu SparcV show that, when anonymizing according to the present invention, encoding speeds for 64-bit plaintext blocks using Data Encryption Standard (DES) will reach at least $1.7 \times 10^6$ anonymizations per second. Encoding speeds for 64-bit plaintext blocks using International Data Encryption Algorithm (IDEA) will reach at least $1.5 \times 10^6$ anonymizations per second. In other words, the anonymization according to the present invention is able to reach a performance level of at least a million anonymizations per second thereby providing sufficient encoding speed for on-line measurements.

The exemplary embodiments can include, for example, any suitable servers, workstations, PCs, laptop computers, personal digital assistants (PDAs), Internet appliances, handheld devices, cellular telephones, smart phones, wireless devices, game consoles, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of anonymizing telecommunication traffic measurement data associated user identifications, comprising:
  acquiring a user identification associated with telecommunication traffic measurement data;
  characterized in that the method further comprises:
inputting the acquired user identification as an initialization vector to a block cipher;
  executing the block cipher in cipher-block chaining mode to output a ciphertext; and
  providing the output ciphertext for use as an anonymized user identification in place of the user identification in further processing of the telecommunication traffic measurement data.

2. The method according to claim 1, characterized in that the inputting further comprises inputting, to the block cipher, a first predetermined string as a cipher key and a second predetermined string as a plaintext.

3. The method according to claim 2, characterized in that the method further comprises generating the first predetermined string and the second predetermined string to be input to the block cipher.

4. The method according to claim 2, characterized in that the cipher-block chaining mode consists of one encryption stage, wherein the inputting the second predetermined string as the plaintext further comprises inputting the second predetermined string as the plaintext to the one encryption stage.

5. The method according to claim 4, characterized in that length of the second predetermined string is at least twice the length of the user identification.

6. The method according to claim 2, characterized in that the cipher-block chaining mode consists of a given number of subsequent encryption stages, wherein the inputting the second predetermined string as the plaintext further comprises dividing the second predetermined string into the given number of plaintext blocks of equal block length, and inputting each of the plaintext blocks to a separate one of the encryption stages.

7. The method according to claim 6, characterized in that the block length is at least twice the length of the user identification.

8. The method according to claim 2, characterized in that the method further comprises re-utilizing the first predetermined string as the cipher key and the second predetermined string as the plaintext in anonymizing at least one subsequent telecommunication traffic measurement data associated user identification.

9. The method according to claim 2, characterized in that the method further comprises distributing the first predetermined string and the second predetermined string for use in anonymizing at least one subsequent telecommunication traffic measurement data associated user identification.

10. The method according to claim 1, characterized in that the method further comprises caching the anonymized user identification with the corresponding user identification for re-use.

11. The method according to claim 2, characterized in that the method further comprises decrypting the anonymized user identification with the first predetermined string and the second predetermined string.

12. An apparatus for anonymizing telecommunication traffic measurement data associated user identifications, characterized in that the apparatus comprises:
  an anonymizer configured to input an acquired user identification as an initialization vector to a block cipher; to execute the block cipher in cipher-block chaining mode to output a ciphertext; and to provide the output ciphertext for use as an anonymized user identification in place of the user identification in further processing of the telecommunication traffic measurement data; the acquired user identification associated with telecommunication traffic measurement data.

13. The apparatus according to claim 12, characterized in that the anonymizer is further configured to input to the block cipher a first predetermined string as a cipher key and a second predetermined string as a plaintext.

14. The apparatus according to claim 12, characterized in that the apparatus further comprises a generator configured to generate the first predetermined string and the second predetermined string to be input to the block cipher.

15. The apparatus according to claim 13, characterized in that the apparatus further comprises a distributor configured to distribute the first predetermined string and the second predetermined string for use in anonymizing at least one subsequent telecommunication traffic measurement data associated user identification.

16. A computer program embodied on a non-transitory computer readable medium, the computer program controlling a data-processing device to perform the step of:
acquiring a user identification associated with telecommunication traffic measurement data;
characterized in that the computer program controls the data-processing device to further perform the steps of:
inputting the acquired user identification as an initialization vector to a block cipher;
executing the block cipher in cipher-block chaining mode to output a ciphertext; and
providing (214) the output ciphertext for use as an anonymized user identification in place of the user identification in further processing of the telecommunication traffic measurement data.

\* \* \* \* \*